United States Patent [19]

Bahoshy et al.

[11] 4,036,992

[45] * July 19, 1977

[54] CHEWING GUMS OF LONGER LASTING SWEETNESS AND FLAVOR

[75] Inventors: Bernard J. Bahoshy, Mahopac; Robert E. Klose, West Nyack, both of N.Y.; Harold A. Nordstrom, Reading, Mass.

[73] Assignee: General Foods Corporation, White Plains, N.Y.

[*] Notice: The portion of the term of this patent subsequent to Mar. 9, 1993, has been disclaimed.

[21] Appl. No.: 644,707

[22] Filed: Dec. 29, 1975

Related U.S. Application Data

[63] Continuation of Ser. No. 295,313, Oct. 5, 1972, Pat. No. 3,943,258.

[51] Int. Cl.² .................................................. A23G 3/30
[52] U.S. Cl. ........................................ 426/3; 426/548

[58] Field of Search ......................................... 426/3–6, 426/548

[56] References Cited

U.S. PATENT DOCUMENTS

| 2,886,447 | 5/1959 | Kramer | 426/3 |
|---|---|---|---|
| 3,492,131 | 1/1970 | Schlatter | 426/3 |
| 3,642,491 | 2/1972 | Schlatter | 426/3 |
| 3,943,258 | 3/1976 | Bahoshy | 426/3 |

*Primary Examiner*—Jeanette M. Hunter
*Attorney, Agent, or Firm*—Richard Kornutik

[57] ABSTRACT

Chewing gums having longer lasting sweetness and flavor are prepared from compositions comprising a chewable gum base, flavor, sweetener in an amount sufficient to impart normally accepted sweetness to the gum, and L-aspartyl-L-phenylalanine methyl ester in an amount effective to produce longer lasting sweetness and flavor. The chewing gums may be either sugar-containing or sugarless.

2 Claims, No Drawings

CHEWING GUMS OF LONGER LASTING SWEETNESS AND FLAVOR

This is a continuation of application Ser. No. 295,313, filed Oct. 5, 1972, now U.S. Pat. No. 3,943,258.

BACKGROUND OF THE INVENTION

This invention relates to chewing gums and more particularly to chewing gums having longer lasting sweetness and flavor.

Commercially available chewing gums generally comprise a substantially water insoluble chewable gum base such as chicle, substitutes thereof, and the like. Incorporated within the gum base may be plasticizers or softeners to improve the texture of the gum, flavors, and sweeteners such as sugar or corn syrup or, for sugarless chewing gums, artificial sweetening agents such as saccharin.

One of the limitations of commercially available chewing gums is their rapid loss of both flavor and sweetness during chewing. Generally, this loss is encountered after about four to five minutes of chewing.

Also, it is found that sugarless chewing gums, while encountering similar flavor and sweetness loss after only a few minutes of chewing, also display a noticeably low initial perception of flavor and sweetness, and lack the strong, pleasant, sweet impact of sugar-containing chewing gums. Increasing the level of saccharin employed to produce a stronger sweetness impact has met with the disadvantage of imparting an extremely bitter aftertaste to the product. Other attempts to obtain a quick initial release of sweetness have resulted in the corresponding loss of long lasting flavor and sweetness effects.

It is accordingly an object of this invention to prepare a chewing gum having a longer lasting sweetness and flavor.

Another object of this invention is to prepare a sugarless chewing gum having a longer lasting sweetness and flavor while further having a substantial initial release of both sweetness and flavor.

These and other objects will become apparent upon reading the specification and claims which follow.

SUMMARY OF THE INVENTION

It has been found in accordance with this invention that a chewing gum having a longer lasting sweetness and flavor impact may be prepared from compositions comprising a chewable gum base, flavor, sweetener in an amount sufficient to impart normally accepted sweetness to the gum, and an amount of L-aspartyl-L-phenylalanine methyl ester (APM) effective to produce a longer lasting sweetness and flavor in the gum. The chewing gum compositions may be either sugar-containing or sugarless.

Further, it has been found that a sugarless chewing gum having longer lasting sweetness and flavor while retaining a substantial initial release of sweetness may be prepared by modifying a portion of the L-aspartyl-L-phenyalanine methyl ester (APM) present in the gum composition, said modification being directed at increasing the solubility rate of the APM.

Chewing gums prepared in accordance with this invention have been found to retain discernible levels of sweetness and flavor after as much as thirty minutes chewing time.

DETAILED DESCRIPTION OF THE INVENTION

L-Aspartyl-L-phenylalanine methyl ester (APM) is a dipeptide sweetening agent described in U.S. Pat. No. 3,492,131.

The chewing gums contemplated under this invention generally comprise a chewable gum base, sweetener in an amount sufficient to impart normally accepted sweetness, flavors, and an amount of APM effective to produce a longer lasting sweetness and flavor impact in the gum product when chewed.

The gum base may be any chewable, substantially water insoluble base such as chicle and substitutes thereof, sorva, guttakay, jelutong, synthetic polymers such as polyvinyl acetate, synthetic resins, rubbers, mixtures of these, and the like. While the amount of gum base employed may vary widely according to the type used, the other ingredients employed, and other like factors, generally it has been found that anywhere from about 15–40% by weight of the gum product may be used, and preferably from about 20–30%. Plasticizers or softeners such as lanolin, propylene glycol, glycerol and other suitable materials of mixtures thereof may also be incorporated in minor amounts into the gum base to achieve a desirable consistency and texture. The ranges generally employed are from 0.5–4.0% by weight of the finished gum composition.

The flavors generally employed in the preparation of flavored chewing gums are the essential oils or synthetic flavorings used either singly or in combination with other natural and synthetic oils. Flavors such as wintergreen, spearmint, peppermint, birch, anise, fruit flavors, mixtures thereof, and the like may be used satisfactorily with a variety of gum bases. The amount of flavoring material used is not critical but may be dependent upon the type used, individual taste preferences, the type gum base employed, and other such considerations.

The remaining portion of the gum composition generally comprises sweeteners. If the chewing gum to be prepared is not of the "sugarless" variety, a sugar is employed. The term "sugar is intended to include not only pure sugar (sucrose) but also the other sugar-like sweeteners normally employed in chewing gums such as dextrose, glucose (corn syrup), and the like, and mixtures thereof.

In the preparation of a "sugarless" chewing gum a synthetic sweetening agent is employed such as saccharin or cyclamate and their salts, the dipeptide sweetening agents, and the like, or mixtures thereof. Generally, when synthetic sweeteners are used, sugar alcohols such as sorbitol and mannitol are also used as bulking agents and also provide some sweetness to the gum, and as such, are intended to be included in the terminology above-used.

The sweetener or sweeteners is added to the chewing gum composition in amounts sufficient to impart normally accepted sweetness to the chewing gum. As previously mentioned, the loss of flavor and sweetness impact in chewing gums so prepared, whether they be sugar-containing or sugarless, generally occurs after about 4 to 5 minutes of chewing. Increasing the level of sweetener employed has the disadvantage of providing excessive sweetness during the initial portion of the chewing period. In sugarless gums, such sweetener increases are further hampered by the undesirable bitter after-taste imparted to the gum by excessive amounts of saccharin.

It has been found that the addition of L-aspartyl-L-phenylalanine methyl ester (APM) to the chewing gum composition in effective amounts extends the time period over which both flavor and sweetness are discernible during chewing. The amount of APM necessary to achieve this flavor and sweetness extension may vary according to the gum base, sweeteners, and flavors employed. Generally, however, it has been found that the addition of APM at levels as low as about 0.1% by weight of the final gum composition is effective. The upper limit at which APM may be added is subject solely to considerations of the undesirability of imparting excessive initial sweetness to the gum product since APM is itself a sweetening agent. While this consideration depends greatly upon individual preference, it has been found generally that levels of greater than about 1.5% APM result in a chewing gum of excessively sweet taste throughout the initial portion of the chewing period.

The use of APM within the above mentioned ranges in either a sugar-containing or a sugarless gum results in a product whose flavor and sweetness is sustained at a discernible level for a period far in excess of that achieved in conventional chewing gums. Chewing gums prepared from compositions of this invention have been found to exhibit sustained flavor and sweetness release for anywhere from ten to thirty minutes of chewing time. Even with such significant increases, it is found that the chewing gums do not exhibit excessive sweetness during the initial chewing period. These results are found both in sugar-containing and sugarless gums made according to this invention.

When APM itself is used as the synthetic sweetener in chewing gum (as described in U.S. Pat. No. 3,642,491) it has been found that the amount needed to impart normally accepted sweetness to the chewing gum is about 0.2% to about 0.25% by weight of the final gum composition. In accordance with this invention, sugarless gum compositions employing APM as the synthetic sweetener display a significant flavor and sweetness extension over commercially available gums when the total amount of APM used is 0.3% by weight of the final composition or greater.

The rapid dissolution of the sugar portion of a sugar containing chewing gum effects a relatively strong, desirable initial perception of sweetness and flavor. This initial sweetness perception is generally unable to be matched by sugarless chewing gums due either to the insolubility of the synthetic sweetener employed or a limitation on the level of synthetic sweetener employed, for example, the bitter after-taste of saccharin. It is found in accordance with this invention that the initial sweetness impart of saccharin sweetened sugarless chewing gums is heightened by the use of APM to extend the sweetness and flavor.

It is possible to still further heighten this initial sweetness perception by modifying a portion of the "sweetnessextending" amount of APM. The modification is directed at increasing the solubility of the APM and may be accomplished by treating the APM with organic or inorganic acids to convert it to its salts, cogrinding with acid, finely grinding the APM, or other such methods aimed at increasing solubility. The amount of modified APM necessary to achieve this sweetness release may be as low as 0.05% by weight of the final gum composition, and present as a portion of the amount of APM effective to increase the sweetness and flavor, to as high as about 0.4%. Lower levels will generally be found sufficient for gums employing saccharin while the upper range may be preferable when APM is used as the synthetic sweetener. The chewing gums so prepared still retain a significant extension of flavor and sweetness impart.

The preparation of the flavored chewing gums of this invention is achieved through more or less conventional methods including a softening of the gum base through mixing, addition of sweetener to the base at which time the desired amount of APM is added, addition of the flavoring substance, and formation of the gum into suitable forms such as sticks.

In order to measure the flavor and sweetness duration in a chewing gum, taste tests were conducted using trained personnel to evaluate the time versus intensity of flavor and sweetness. Panel members are given a stick of gum and asked to chew and record their values for flavor intensity at thirty second intervals. Comparisons are made between a sample of control gum and the same gum formulation with APM added in accordance with this invention. Results show that use of APM in both sugarless and sugarless and sugar-containing gums results in a flavor and sweetness extension over control samples of as musch as thirty minutes.

EXAMPLE I

Sugar-containing gum sticks were prepared from the following formulations:

| Ingredient | % Composition A | B |
|---|---|---|
| Chewing Gum Base | 23.993 | 23.993 |
| Sugar, 6X | 59.737 | 59.387 |
| Corn Syrup 46° B | 14.245 | 14.245 |
| Peppermint Oil | 1.276 | 1.276 |
| Glycerol | 0.749 | 0.749 |
| APM | — | 0.350 |

The gum base was softened for ten minutes at 150° F in a one gallon Sigma mixer. The glycerol was added and mixed for 10 minutes and the corn syrup was then added and mixing continued for 10 minutes. For Sample A, the sugar was added and blended for 10 minutes while in Sample B the APM was blended with the sugar and added to the mixer is above.

The heating medium was turned off, the peppermint oil was added, and mixing continued for two minutes. Mixing was then stopped, the gum was removed from the mixer, rolled into sheets. tempered, and scored into sticks.

On the basis of panel result, sample A was found to have reached the point where flavor and sweetness are barely detectable after five minutes of chewing while Sample B was found not to have reached the barely detectable level even after over 10 minutes of chewing.

EXAMPLE II

Gum sticks were prepared according to Example I from the following ingredients:

| Ingredient | % Composition A | B |
|---|---|---|
| Chewing Gum Base | 23.993 | 23.993 |
| Sugar | 59.736 | 58.736 |
| Corn Syrup | 14.246 | 14.246 |
| Peppermint Oil | 1.276 | 1.276 |
| Glycerol | 0.749 | 0.749 |

-continued

| Ingredient | % Composition | |
|---|---|---|
| | A | B |
| APM | — | 1.000 |

Results of the panel testing indicated that Sample B with 1% APM added had a flavor and sweetness extension of thirty minutes over Sample A and exhibited no undesirable after tastes.

EXAMPLE III

Sugarless chewing gums were prepared according to Example I from the following ingredients:

| Ingredient | % Composition | |
|---|---|---|
| | A | B |
| Sorbitol | 51.5 | 51.3 |
| Gum Base | 34.9 | 34.9 |
| Mannitol | 8.1 | 8.1 |
| Glycerol | 2.8 | 2.8 |
| Water | 1.4 | 1.4 |
| Flavor | 1.1 | 1.1 |
| Saccharin | 0.2 | — |
| APM | — | 0.4 |

Sample B was found to have a better overall sweetness impact than Sample A and a flavor and sweetness extension over Sample A of greater than 6 minutes.

EXAMPLE IV

Sugarless gum sticks are prepared as in Example I from the following formulation:

| Ingredient | % Composition |
|---|---|
| Sorbitol | 51.3 |
| Gum Base | 34.9 |
| Mannitol | 8.1 |
| Glycerol | 2.8 |
| Water | 1.4 |
| Flavor | 1.1 |
| Saccharin | — |
| APM | 0.3 |
| Modified APM | 0.1 |

The modified APM is prepared by co-drying a solution of three parts citric acid and one part APM and then finely grinding the dried material.

While this invention has been described with respect to the above presented specific embodiments, they are intended to be illustrative of only a few of the numerous applications of this discovery. Variations in the gum compositions and preparations as well as the use of fixed flavors, other sweetening systems, and the like are believed ascertainable to those skilled-in-the-art without departing from the scope and spirit of this invention.

We claim:

1. In a sweetened chewing gum composition which comprises gum base, flavor and a major amount of sugar sweetener which imparts normal sweetness to said gum the improvement which comprises at least 0.1% L-aspartyl-L-phenylalanine methyl ester by weight of the total gum composition whereby the normal sweetness and flavor is extended.

2. The chewing gum composition of claim 1 wherein said amount of L-aspartyl-L-phenylalanine methyl ester is from about 0.1% to about 1.5% by weight of the final gum composition effective to produce a longer lasting sweetness and flavor in said gum.

* * * * *